United States Patent
Kakutani (10) Patent No.: US 8,395,823 B2
(45) Date of Patent: Mar. 12, 2013

(54) DEVICE CAPABLE OF READING PLURAL DOCUMENTS, METHOD OF CONTROLLING THE DEVICE, AND PROGRAM

(75) Inventor: Naoya Kakutani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/592,048

(22) Filed: Aug. 22, 2012

(65) Prior Publication Data
US 2012/0320403 A1    Dec. 20, 2012

Related U.S. Application Data (63) Continuation of application No. 12/753,680, filed on Apr. 2, 2010, now Pat. No. 8,274,709, which is a continuation of application No. PCT/JP2009/069174, filed on Nov. 11, 2009.

(30) Foreign Application Priority Data

Aug. 7, 2009   (JP) .................................. 2009-184800

(51) Int. Cl.
*H04N 1/40* (2006.01)
*H04N 1/46* (2006.01)
*G06K 15/00* (2006.01)
*G03G 21/04* (2006.01)

(52) U.S. Cl. ...... 358/3.28; 358/1.14; 358/505; 399/366; 399/381; 726/26; 726/31; 726/33

(58) Field of Classification Search ........................ None
See application file for complete search history.

(56) References Cited

U.S. PATENT DOCUMENTS

2003/0179412 A1* 9/2003 Matsunoshita ............. 358/3.28
2006/0028689 A1* 2/2006 Perry et al. .................. 358/3.28

FOREIGN PATENT DOCUMENTS

JP    2008158858 A    7/2008
JP    2008301346 A    12/2008

* cited by examiner

*Primary Examiner* — Thomas Lett
(74) *Attorney, Agent, or Firm* — Canon U.S.A., Inc. IP Division (57) ABSTRACT

Provided is a device that prevents unauthorized copying of a document to which copy inhibition information is added.

9 Claims, 7 Drawing Sheets

DEVICE CAPABLE OF READING PLURAL DOCUMENTS, METHOD OF CONTROLLING THE DEVICE, AND PROGRAM

CROSS-REFERENCE TO RELATED APPLICATIONS

This application is a Continuation of U.S. patent application Ser. No. 12/753,680, filed Apr. 2, 2010, which is a Continuation of International Application No. PCT/JP2009/069174, filed Nov. 11, 2009, which claims the benefit of Japanese Patent Application No. 2009-184800, filed Aug. 7, 2009, all of which are hereby incorporated by reference herein in their entirety.

TECHNICAL FIELD

The present invention relates to a device capable of reading plural documents, a method of controlling the device, and a program.

BACKGROUND ART

In recent years, unauthorized copying of documents has become more frequent as a result of the spread of copiers. A technique is provided as a countermeasure that inhibits copying of a specific document. The technique that inhibits copying is as follows.

A copier disclosed in patent literature 1 adds copy inhibition information to a document. When the copier reads the document, the copier inhibits copying of the document.

A copier disclosed in patent literature 2 adds conditional copy permission information and a condition (for example, a password) to a document. When the copier reads the document, the copier requests a user to input the condition added to the document. If the input condition is correct, the copier makes a copy of the document. If the input condition is wrong, the copier does not make a copy of the document.

CITATION LIST

Patent Literature

PTL 1: Japanese Patent Laid-Open No. 04-009963
PTL 2: Japanese Patent Laid-Open No. 2002-305646

SUMMARY OF INVENTION

Technical Problem

However, if a malicious user wants to make an unauthorized copy of a document to which copy inhibition information is added, such a user may think as follows.

I have a document to which conditional copy permission information and a condition are added. Fortunately, I know the condition (for example, a password). When I put the document on a document plate, the copier would ask me to input the condition. At this time, I can input the condition correctly. As long as I can input the condition correctly, the copier has no other choice but to make a copy of the document on the document plate. So I try to put the document to which the conditional copy permission information is added, together with a document to which copy inhibition information is added. Then, a copy of the document to which the copy inhibition information is added should be made. Such a malicious user may think as described above, and make an unauthorized copy of the document.

The present invention is made to inhibit the malicious user from making an unauthorized copy of the document. Also, other output techniques (for example, techniques of sending e-mails, facsimiles, etc.) may have a problem similar to the above-described problem.

Solution to Problem

A device according to an embodiment of the present invention includes generating means for reading a plurality of documents and generating document images corresponding to the documents; and extracting means capable of extracting conditional output permission information and output inhibition information from the generated document images. If the conditional output permission information and the output inhibition information are extracted by the extracting means, the generated document images are not output. Accordingly, unauthorized outputting by a malicious user can be inhibited.

Also, a device according to an embodiment of the present invention includes reading means for reading a document that is inhibited from being output and a document that is conditionally permitted to be output; and inhibiting means for inhibiting the documents read by the reading means from being copied.

Advantageous Effects of Invention

With the present invention, the behavior of a malicious user can be prevented when the user intends to make an unauthorized copy of a document that is inhibited from being output.

DESCRIPTION OF EMBODIMENTS

Preferred embodiments of the present invention will be described below with reference to the attached drawings.

First Embodiment

A copy of a document to which conditional copy permission information and a condition are added can be made only if the condition is satisfied. Owing to this, for example, if a user who knows the condition of the document inputs the condition correctly to a copier and intends to make a copy of the document, the copier has no choice but to make a copy of the document.

A first embodiment of the present invention aims at such a user who uses the document to make a copy of another document to which copy inhibition information is added. In particular, in this embodiment, the user is not only inhibited from making a copy of another document, but also from making a copy of the document (the document to which the conditional copy permission information and the condition are added) as a penalty.

Now, words used in the first embodiment of the present invention will be described. Specific information represents any information listed below. First specific information includes two pieces of information of copy inhibition information and a document ID. Second specific information includes three pieces of information of conditional copy permission information, a condition, and a document ID. Also, in the first embodiment of the present invention, the copy inhibition information and the conditional copy permission information are collectively called copy control information.

Next, a process of creating a document to which specific information is added will be described. Firstly, specific information is encoded to acquire embedded information. Secondly, an image of the embedded information is formed to generate a bar code. The generated bar code is replicated. The resulting plurality of bar codes are combined to generate a bar code group. Thirdly, the bar code group is merged with a document image, to generate a document image with the bar codes merged. Lastly, the document image with the bar codes merged is printed. Accordingly, a document to which the specific information is added in the form of the bar codes is created. The process series is called "addition" of the specific information. Also, the process of encoding the specific information to form an image of the specific information (with this process, a bar code is generated) is called bar-coding of the specific information.

The bar code group, in which the plurality of bar codes are combined, is merged with the document image and printed, in order to obtain an effect of increasing resistance characteristics. Since the bar code group is merged with the document image and printed, the specific information can be extracted from the document as long as at least a single bar code is present in the document in an uncontaminated manner.

In the following embodiments including the first embodiment of the present invention, processes in respective steps in a mode, in which a bar code group is used (a mode in which the bar code group is merged with the document image and printed, and a mode in which the printed document is read and copying of the document is controlled), will be described for example. However, a mode in which only a single bar code is merged with a document image and printed, and a mode in which the printed document is read and copying of the document is controlled, may be conceived although the above-described effect is degraded.

In this embodiment, the number of bar codes included in a bar code group corresponds to the size of a document image. For example, when the document image has a size that is printed on an A4-size (21×29.7 cm) sheet, a bar code group includes 21×29 bar codes. Accordingly, bar codes are included in the entire area of the created document.

Next, a process of extracting specific information from a document, to which the specific information is added in the form of bar codes, will be described. Firstly, a document put on a document plate or an auto document feeder (ADF) is read, and a document image of the read document is generated. Secondly, bar codes are found from the document image. Thirdly, information in the found bar codes is acquired to acquire embedded information. Fourthly, the embedded information is decoded to acquire specific information. Accordingly, the specific information can be acquired from the document to which the specific information is added in the form of the bar codes. The second and later processes in the process series is called "extraction" of the specific information.

The embedded information includes an error correction code, but the specific information does not include an error correction code.

Figure 1:
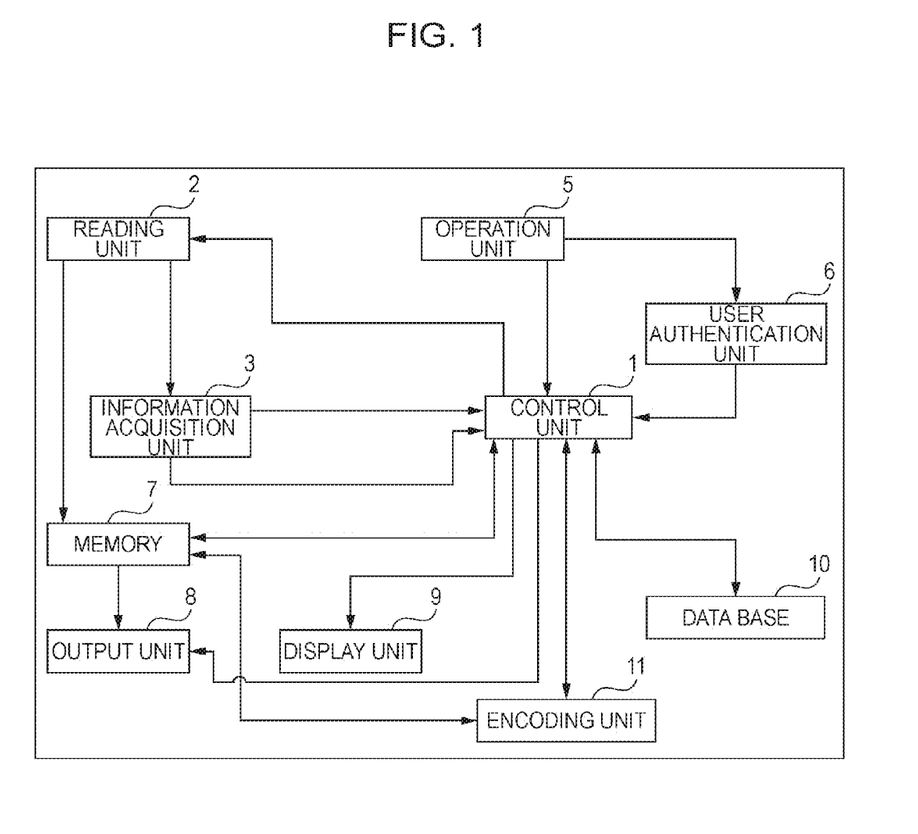
FIG. 1 is a block diagram of a MFP according to a first embodiment.

A configuration of a multi function peripheral (MFP) according to the first embodiment of the present invention will be described in detail with reference to FIG. 1. FIG. 1 is a block diagram showing the configuration of the MFP according to this embodiment.

A control unit 1 controls operations of respective units in the MFP. The control unit 1 includes a central processing unit (CPU) (not shown here). The control unit 1 also decodes embedded information.

An operation unit 5 receives an operation input to the MFP from a user.

A user authentication unit 6 manages information required for authenticating a user who uses the MFP. The operation of the user authentication unit 6 will be described later in more detail.

A reading unit 2 reads (for example, scans) the document and generates a document image of the document. It is to be noted that a document is a paper document such as a printed matter, whereas a document image is digital (or analog) data.

An information acquisition unit 3 finds a bar code from the document image, and acquires information in the bar code.

A memory 7 stores the document image.

An output unit 8 outputs the document image after the memory 7 reads the document image. For example, the output unit 8 prints the document image, or sends the document image to an external device. Herein, the external device is, for example, a PC that is connected with the MFP through a network.

A display unit 9 displays a display screen under the control of the control unit 1.

A data base 10 performs print setting for the MFP and records a log of use.

An encoding unit 11 performs encoding and image formation as described above.

Next, an operation performed by a user and a process performed by the MFP in accordance with the operation by the user to add specific information will be described in detail.

A user who wants to add specific information to a document inputs a user ID and a password through the operation unit 5 while watching a setting screen 3002 displayed on the display unit 9.

The information input through the operation unit 5 is sent from the operation unit 5 to the user authentication unit 6. The user authentication unit 6 determines whether the input password is correct with reference to the managed information.

If it is determined that the password is correct, the user authentication unit 6 sends the determination of the correct password and the user ID to the control unit 1.

Figure 6:
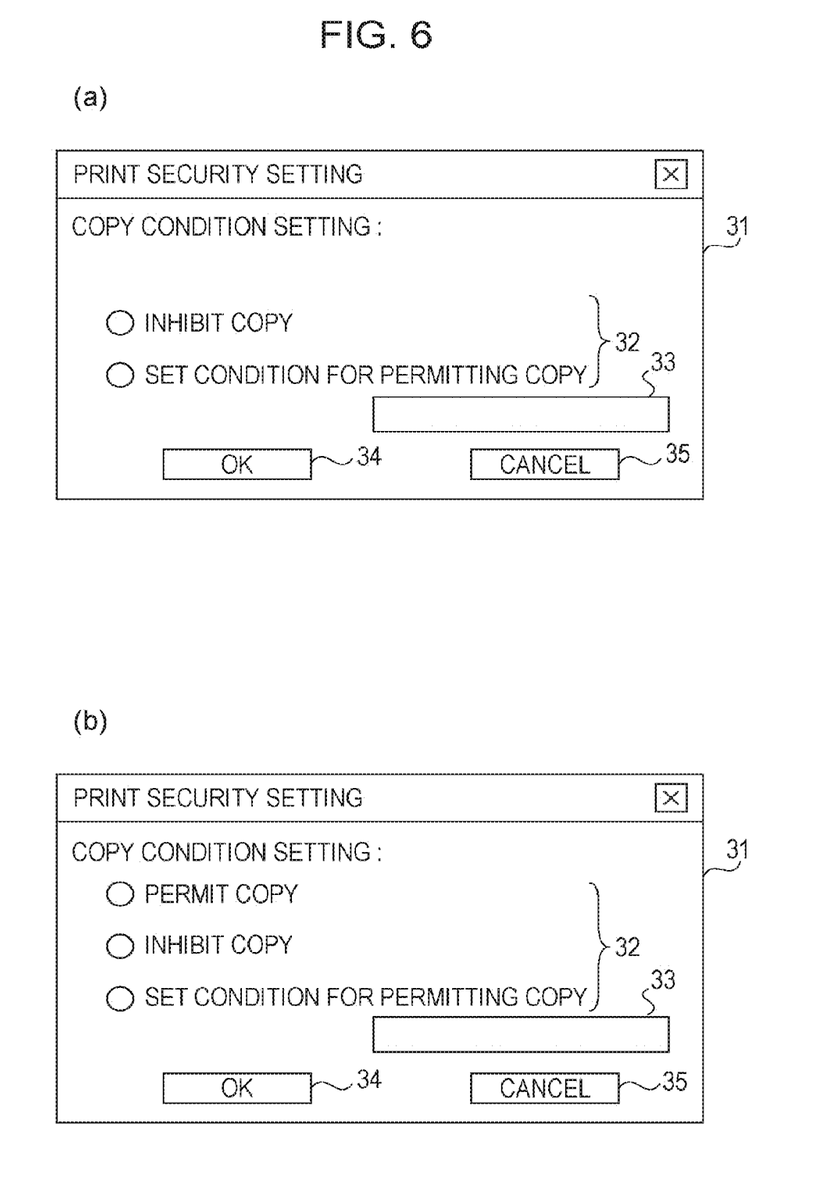
FIG. 6 illustrates examples of screens for setting specific information.

The control unit 1 that has received the determination of the correct password and the user ID causes the display unit 9 to display a check box (not shown here). The check box has an item by which the user can select whether specific information is added. If the user checks the box through the operation unit 5, the control unit 1 causes the display unit 9 to display a print security setting dialogue box 31 shown in FIG. 6(a).

Next, the user may check one of radio buttons 32 in the print security setting dialogue box 31 through the operation unit 5. Then, the user can select one of an option to "inhibit copy" and an option to "set condition for permitting copy." If the selected option is to "inhibit copy," copy inhibition information and a document ID are added as specific information to a document to be printed (which will be described later). If the selected option is to "set condition for permitting copy," conditional copy permission information, a document ID, and a condition are added as specific information to a document to be printed (which will be described later).

If the user selects to "set condition for permitting copy," a condition input field 33 is allowed to be input, and the user may input the condition (for example, a password or a user ID) in the field. If the condition is a password, the user may input a password at this time. If the condition is a user ID, the user does not have to input a user ID at this time, and may input merely selection of the user ID as the condition. This is because the user ID has been already input for user authentication.

It is to be noted that the same document ID is added to documents created by a single copy operation. Herein, the single copy operation is copying of a set of documents put on the document plate or the ADF by a single instruction for copying.

Thus, for example, it is assumed that a user puts a set of documents (for example, 4 sheets) on the ADF and gives an instruction to the MFP for making three sets of copies. In this case, the three sets of copies (that is, 12 sheets) are created by a single copy operation. The same document ID is added to the three sets of copies.

Specific information may be added by an input through a driver or a utility in the PC connected with the MFP. In the first embodiment of the present invention, the copy control information which is added to a single document is only one of the copy inhibition information and the conditional copy permission information.

Figure 2:
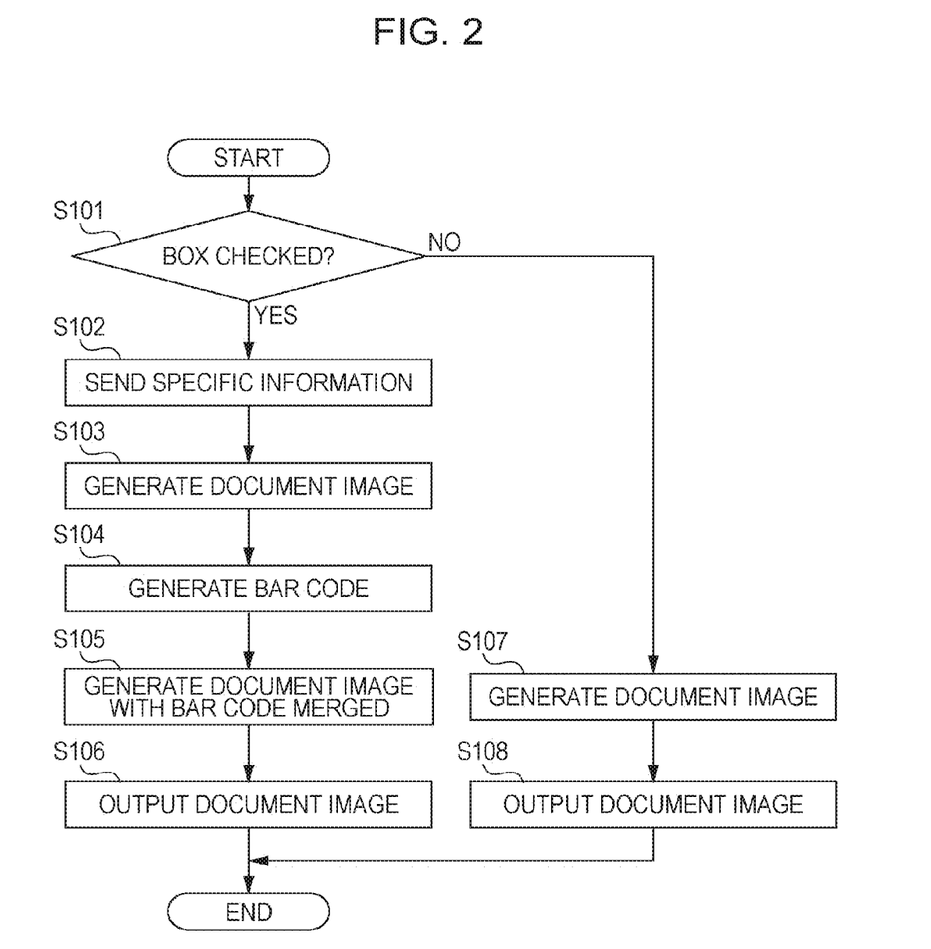
FIG. 2 is a flowchart showing a document creation process of the MFP.

Next, a method of creating a document including a bar code will be described in detail with reference to FIG. 2. FIG. 2 is a flowchart showing a document creation process of the MFP.

The control unit 1 determines whether the box is checked (S101).

If it is determined that the box is checked in S101, the control unit 1 uses the print security setting dialogue box 31 to receive the selection of the user through the operation unit 5. Then, the control unit 1 sends specific information corresponding to the selection to the encoding unit 11 (S102). As described above, if the selected option is to "inhibit copy," the specific information corresponding to the selection includes copy inhibition information and a document ID. If the selected option is to "set condition for permitting copy," the specific information corresponding to the selection includes conditional copy permission information, a document ID, and a condition.

Next, the reading unit 2 reads a document, generates a document image, and sends the generated document image to the memory 7 and the information acquisition unit 3 (S103).

Next, the encoding unit 11 encodes the specific information and forms an image of the specific information to generate a bar code. Also, the encoding unit 11 replicates the bar code by the number corresponding to the size of the document image (for example, 608 bar codes). Then, the encoding unit 11 combines the resultant plurality of bar codes (for example, 609 bar codes) to generate a bar code group, and sends the bar code group to the memory 7 (S104).

Next, when the control unit 1 detects that the memory 7 has received the bar code group and the document image, the memory 7 merges the bar code group with the document image to generate the document image with the bar codes merged (S105). As described above, in this embodiment, the plurality of bar codes are combined to generate the bar code group, and the generated bar code group is merged with the document image. Thus, the document image with the bar codes merged is generated. Alternatively, a similar image may be generated even if the process is changed such that bar codes are repeatedly merged with a document image one by one.

Next, the control unit 1 sends the document image with the bar codes merged from the memory 7 to the output unit 8, and causes the output unit 8 to output the document image (S106). A method of outputting the document image by the output unit 8 may be, for example, printing of the document image. When the document image is printed, a copy of the document that is the original of the document image is made.

If a check box 2011 is not checked, the reading unit 2 reads the document, generates the document image, and sends the generated document image to the memory 7 (S107). Next, when the control unit 1 detects that the memory 7 has received the document image, the control unit 1 causes the memory 7 to send the document image to the output unit 8, and causes the output unit 8 to output the document image (S108).

Figure 3:
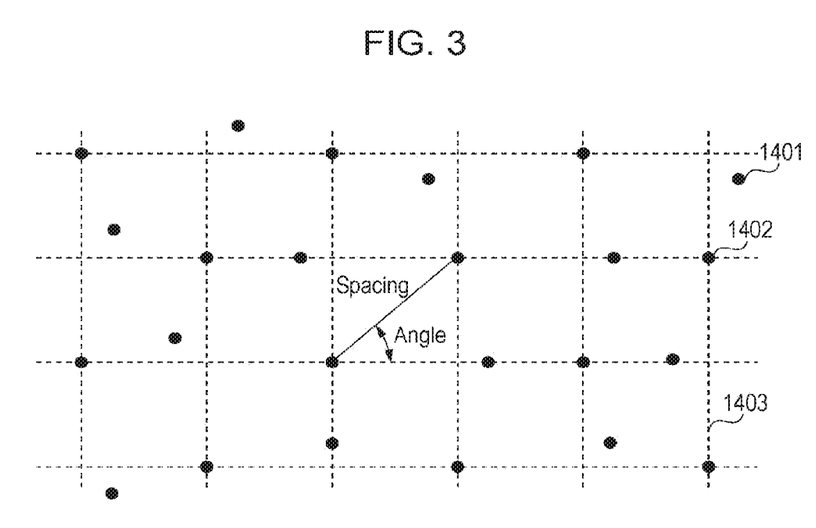
FIG. 3 illustrates a part of a bar code plotted with a reference grid.
Figure 5:
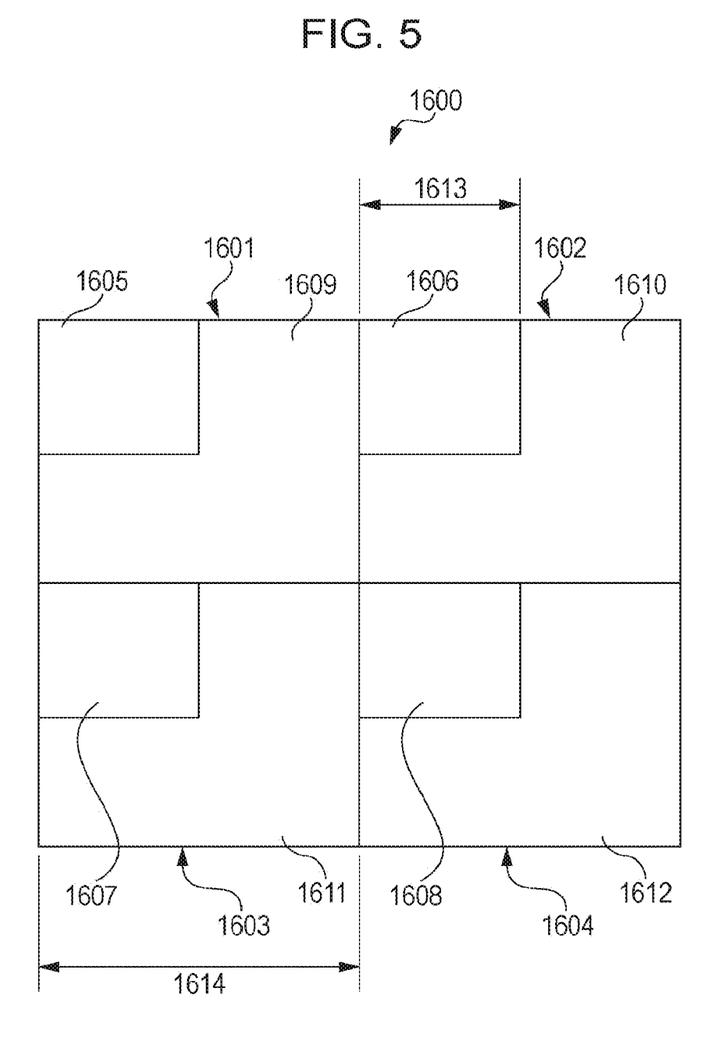
FIG. 5 illustrates a bar code.

Next, the bar code will be described in detail with reference to FIGS. 3 and 5. FIG. 5 illustrates a bar code. FIG. 3 illustrates a part of the bar code plotted with a reference grid.

Reference sign 1600 in FIG. 5 denotes a bar code having a size of about 1×1 cm. The bar code 1600 has two types of regions including high-density regions (1605 to 1608) and low-density regions (1609 to 1612).

Each high-density region includes encoded copy control information, and each low-density region includes an encoded condition. Although it is described later, the condition included in the low-density region may be directly a condition or may be a hashed condition. If a condition is not present, that is, if the high-density region includes copy inhibition information (in a case of a second embodiment, copy inhibition information or copy permission information), the low-density region includes dummy information (meaningless information). The high-density region uses a large number of error correction codes as compared with the low-density region.

The high-density region is smaller than the low-density region although the error correction codes are used by a large number because the copy control information has a smaller data size than the data size of the condition. In the specification, the condition is a user ID and a password for the simplification of description. However, the condition is not limited thereto. For example, the condition may be other information such as a date or a section to which a user belongs. Alternatively, the condition may be created by combining various pieces of information (for example, a date, a user ID, a password, and a section to which a user belongs may be combined). To handle any complicated condition (although the capacity is limited), in the specification, the low-density region is larger than the high-density region.

FIG. 3 illustrates a part of the bar code plotted with a reference grid. FIG. 3 illustrates information dots 1401 and array dots 1402 which define a bar code. The array dots 1402 are located on a reference grid 1403 indicated by dotted lines, at a regular interval (in particular, on the intersections of the reference grid 1403).

The information dots are located at positions shifted from the intersections of the reference grid 1403. The specific information is expressed by shift directions of the information dots (directions in which the information dots are shifted from the intersections). Although the reference grid is indicated by dotted lines in FIG. 3, the reference grid is not actually printed.

Next, a process of extracting specific information from a document image will be described. As described above, the process of extracting the specific information includes (1) finding bar codes from a document image, (2) acquiring information in the found bar codes to acquire embedded information, and (3) decoding the embedded information to acquire the specific information.

Figure 4:
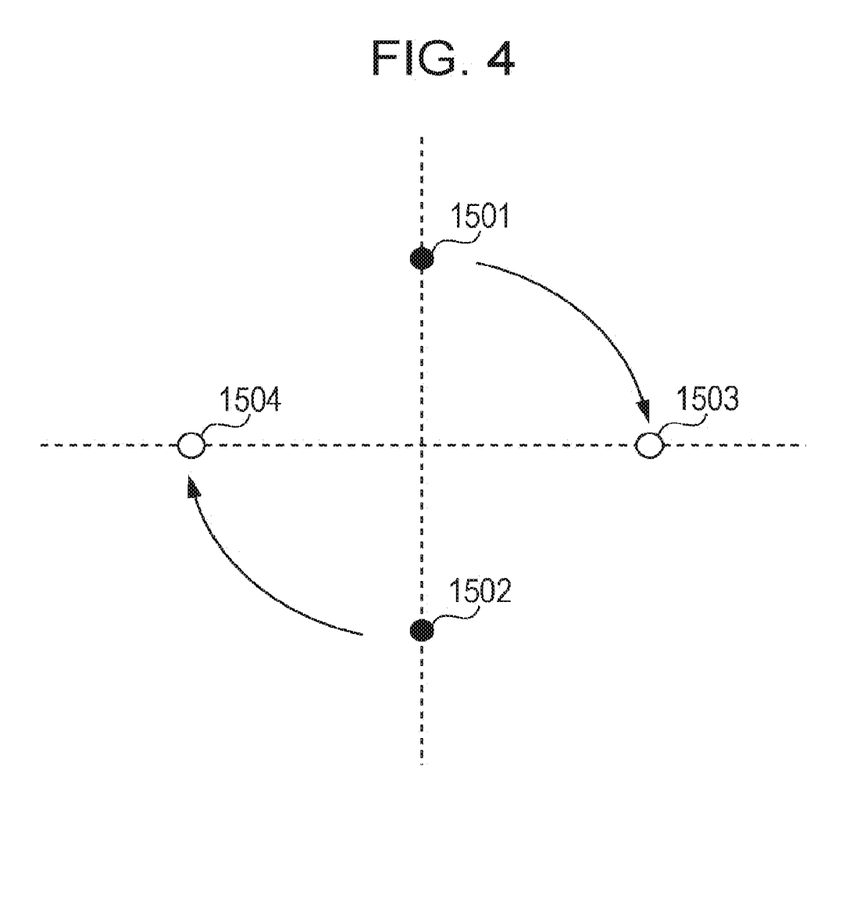
FIG. 4 illustrates a method of finding a bar code from a document image.

First, the method of (1) finding the bar codes from the document image will be described in detail with reference to FIG. 4.

The information acquisition unit 3 selects a desirable dot 1501 in a document image. Then, the information acquisition unit 3 selects a desirable dot 1502 located near the selected dot. The information acquisition unit 3 rotates the positions of the selected dots around a center point between the dots by 90°. If other dots are present at the position after the rotation, the information acquisition unit 3 determines that the selected dots are the array dots which are vertically and horizontally arranged at a regular interval.

In contrast, if other dots are not present, the information acquisition unit 3 determines that the selected dots are the information dots which are arranged at random positions.

In this way, the information acquisition unit 3 finds the two array dots, and then finds other array dots under the rule in which the array dots are vertically and horizontally arranged at a regular interval. The information acquisition unit 3 finds a plurality of array dots (for example, 100 dots each in the horizontal and vertical directions), and then virtually plots a reference grid on the reference dots. In this case, the reference grid has about 200 lines in the vertical direction, and about 200 lines in the horizontal direction. Thus, the reference grid has about 400 lines in total. The number of lines is determined with reference to FIG. 3 (in FIG. 3, two array dots are arranged in the vertical direction and three array dots are arranged in the horizontal direction, and hence three lines are arranged in the vertical direction and six lines are arranged in the horizontal direction).

In the first embodiment of the present invention, the above-described processes (from the process of selecting a desirable dot to the process of virtually plotting the reference grid) are collectively called finding of bar codes. This is because a bar code must be present in a region defined by this reference grid. In the following embodiments including this embodiment, it is assumed that a bar code (including a high-density region and a low-density region) has a size equivalent to a size of a region defined by "vertically arranged 100 lines"×"horizontally arranged 100 lines" (an interval between two lines is about 100 μm). The information acquisition unit 3 plots a reference grid having a size that is at least twice the size of the aforementioned reference grid in the vertical and horizontal directions. Hence, at least a single bar code is present in the reference grid.

The information acquisition unit 3 repeatedly performs the above-described processes (from the process of selecting a desirable dot to the process of virtually plotting a reference grid) an N-number of times (for example, 20 times) while a subject region is changed. For example, the entire document image is divided into the N-number of regions (e.g., vertically arranged 4 regions and horizontally arranged 5 regions, that is, 20 regions in total), and the above-described processes are repeated the N-number of times. By repeating the above-described processes the N-number of times, even if a plurality of bar code groups are present in a document image, at least a single bar code can be found from each of the bar code groups.

For example, there may be a case in which two documents are put on the document plate, copy inhibition information is added to the first document, and conditional copy permission information is added to the second document. In this case, a plurality of bar code groups are present in document images. Even in this case, since the reference grid is plotted in the various regions, the information acquisition unit 3 can find at least a single bar code included in each of the bar code groups. That is, a bar code corresponding to the copy inhibition information and a bar code corresponding to the conditional copy permission information can be found.

The given description is for the method of finding bar codes.

Next, the method of (2) acquiring the information in the found bar codes to acquire the embedded information will be described.

(2-1) The information acquisition unit 3 obtains the shift directions of the information dots from the intersections of the reference grid. In the aforementioned example, the vertically arranged 200 lines and the horizontally arranged 200 lines are plotted. Thus, 40000 intersections in total are present. Among these 40000 intersections, array dots are present on 20000 intersections, and hence shift directions of information dots are obtained from the residual 20000 intersections. Accordingly, 3-bit information is acquired for every information dot.

In particular, the information acquisition unit 3 acquires information of 0 to 7 (3-bit information) such that 0 is acquired when an information dot is shifted to the upper side, 1 is acquired when an information dot is shifted to the upper right side, 2 is acquired when an information dot is shifted to the right side, etc. (hereinafter, a value of information is incremented by one as the direction is shifted by 45°). As a result, information of 3 bits×20000=60000 bits can be acquired. The 60000-bit information includes embedded information.

(2-2) Next, a process of finding embedded information from the acquired information (for example, 60000-bit information) will be described.

Though it is not described when the encoding process is described, the encoding unit 11 acquires embedded information such that a predetermined bit string (for example, a bit string including 20 bits of 01010101010101010101) is included at the start during encoding.

The information acquisition unit 3 finds the predetermined bit string from the acquired information (for example, 60000-bit information). Then, the information acquisition unit 3 determines the information as the embedded information until the next predetermined bit string is found.

That is, the information acquisition unit 3 determines "the predetermined bit string+the information string interposed between the predetermined bit strings" as the embedded information. Thus, the information acquisition unit 3 acquires "the predetermined bit string+the information string interposed between the predetermined bit strings" as the embedded information.

The information acquisition unit 3 performs the aforementioned processes (processes of 2-1 and 2-2) for all the plural reference grids (i.e., 20 reference grids).

The given description is for the method of (2) acquiring the information in the bar codes to acquire the embedded information.

Finally, the process of (3) decoding the embedded information to acquire the specific information will be described.

The control unit 1 that has found a single bar code decodes embedded information included in a high-density region of the bar code. To be more specific, an error correction code and a predetermined bit string are removed (deleted) from the embedded information. Since the control unit 1 performs decoding, the control unit 1 can acquire copy control information and a document ID.

Also, when the control unit 1 acquires conditional copy permission information as the copy control information, the control unit 1 decodes embedded information included in a low-density region to acquire a condition. The low-density region is not always decoded, but is decoded only when the conditional copy permission information is acquired because the data size of the embedded information in the low-density region is larger than the data size of the high-density region and hence decoding for the embedded information in the low-density region may take a time.

The given description is for the process of (3) decoding the embedded information to acquire the specific information.

The above-described process series is called "extraction." By performing the extraction process, the specific information can be acquired from the document image.

Figure 7:
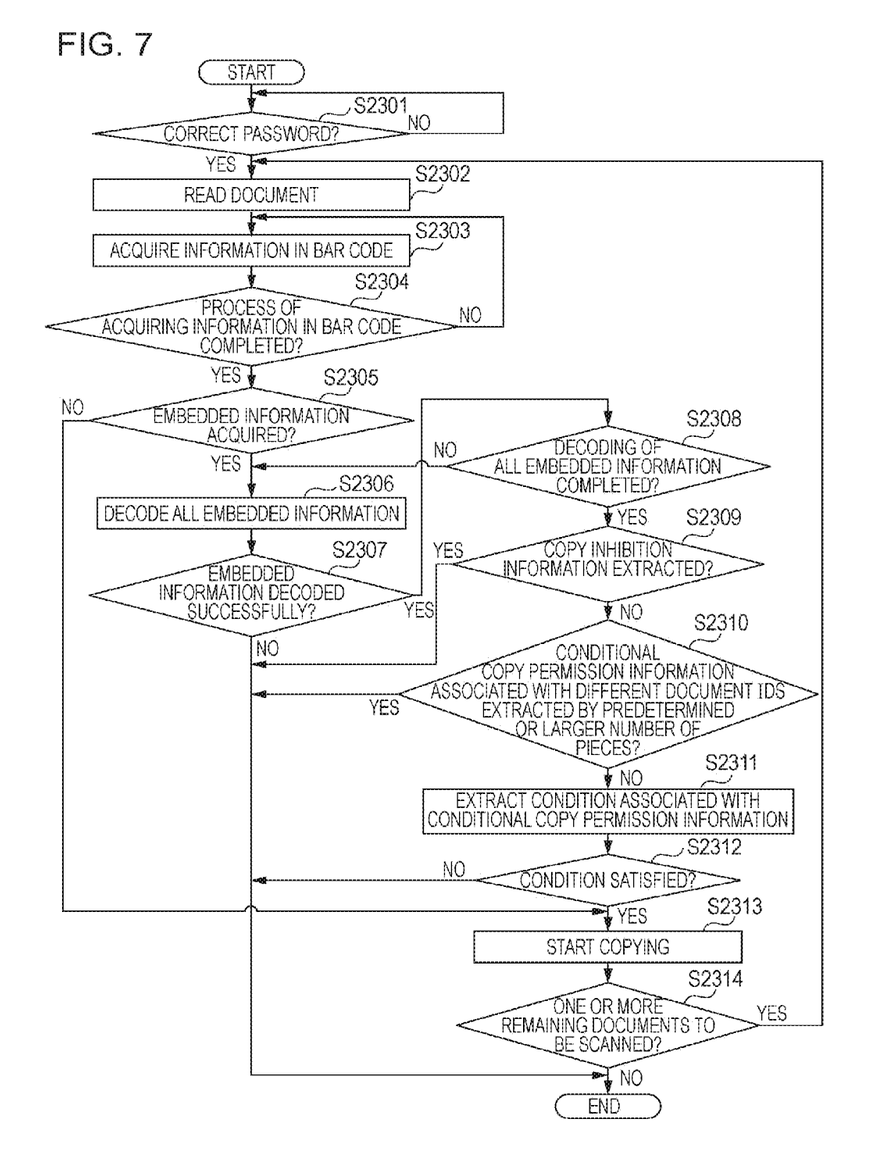
FIG. 7 is a flowchart showing a flow of copy control executed by the MFP.

Next, control for copying executed by the MFP that has a function of inhibiting unauthorized copying will be described in detail with reference to FIGS. 1 and 7. FIG. 7 is a flowchart showing a flow of control for copying executed by the MFP according to this embodiment. It is to be noted that the MFP is a copier that can add and extract specific information.

A user who wants to make a copy of a document with bar codes merged inputs a user ID and a password through the operation unit 5 while watching the setting screen 3002 displayed on the display unit 9. The information input through the operation unit 5 is sent from the operation unit 5 to the user authentication unit 6. If the user authentication unit 6 determines whether the input password is correct with reference to the managed information (S2301).

In step S2301, if the user authentication unit 6 determines that the password is not correct, the MFP waits for the input of the correct password.

In step S2301, if the user authentication unit 6 determines that the password is correct, the user authentication unit 6 sends the determination of the correct password and the user ID to the control unit 1. The control unit 1 that has received the determination of the correct password and the user ID causes the display unit 9 to display a notification that allows a user to give a copy start instruction.

Then, the user inputs the copy start instruction through the operation unit 5. Then, the operation unit 5 notifies the start of copying to the control unit 1. The control unit 1 controls the reading unit 2 to read the document. The document image generated in this way is sent to the memory 7 and the information acquisition unit 3 (S2302). If a plurality of documents to be read by the reading unit 2 are present, document images for the plural documents are generated. When the memory 7 receives the document image, the control unit 1 starts to execute image processing for the document image. The image processing is required for the document image to allow the output unit 8 to print the document image (for example, half toning).

Next, the information acquisition unit 3 finds a bar code from the document image, and acquires information in the found bar code to acquire embedded information (S2303). As described above, the process in S2303 is performed the N-number of times (for example, 20 times), and hence 20 pieces of the embedded information are possibly acquired at maximum.

Next, the control unit 1 asks the information acquisition unit 3 whether the bar-code information acquiring process executed in step S2302 has been completed (S2304). If the bar-code information acquiring process has not been completed, the flow returns to the process in step S2303.

If the information acquisition unit 3 has completed the bar-code information acquiring process in step S2304, the control unit 1 determines whether the information acquisition unit 3 has acquired at least a piece of embedded information from the document image in the bar-code information acquiring process (S2305).

If the information acquisition unit 3 has acquired at least a single piece of embedded information from the document image in step S2305, the control unit 1 decodes information in a high-density region of the acquired embedded information (S2306).

Then, the control unit 1 acquires copy control information and a document ID in specific information. The copy control information may include either or both copy inhibition information and conditional copy permission information.

Next, the control unit 1 determines whether the information in the high-density region of the embedded information has been decoded successfully (S2307).

If the control unit 1 determines that the information in the high-density region of the embedded information has been decoded successfully in step S2307, the control unit 1 determines whether decoding of all information in the high-density region of the embedded information has been completed (S2308).

If the control unit 1 determines that decoding of all information in the high-density region of the embedded information has not been completed in step S2308, the control unit 1 stops the copy operation of the MFP. That is, the document image generated by the reading unit 2 is not output.

If the control unit 1 determines that all information of the embedded information has been completed in step S2308, the control unit 1 determines whether the copy control information includes copy inhibition information (S2309).

If the control unit 1 determines that the copy control information includes the copy inhibition information in S2309, the control unit 1 stops the copy operation of the MFP. That is, the document image generated by the reading unit 2 is not output.

If the MFP has extracted the copy inhibition information and the conditional copy permission information in the process in step S2309 (that is, if the copy control information acquired in S2306 includes both), no document is copied. In other words, the document, to which the conditional copy permission information is added and which should be copied, and the document, to which the copy inhibition information is added, are not copied. That is, if both information is extracted, the MFP (the control unit 1 included therein) gives preference to the copy inhibition information and inhibits the document from being copied. As a result, the behavior of the malicious user can be prevented from making an unauthorized copy of the document to which the copy inhibition information is added by using the document to which the conditional copy permission information is added.

In this case, the control unit 1 performs control not to request the user to input the condition associated with the conditional copy permission information. That is, the display unit 9 does not display the screen to allow the user to input information corresponding to the condition. The condition associated with the conditional copy permission information is a condition included in a bar code that is equivalent to the bar code from which the conditional copy permission information is acquired.

If the control unit 1 determines that the copy control information does not include the copy inhibition information in S2309, the control unit 1 determines whether a predetermined (for example, two) or larger number of pieces of copy permission information associated with different document IDs have been extracted (S2310). The conditional copy permission information associated with the document ID is conditional copy permission information included in a bar code that is equivalent to the bar code from which the document ID is acquired.

If the control unit 1 determines that the predetermined or larger number (for example, two) of pieces of the conditional copy permission information associated with the different document IDs have been extracted in S2310, the control unit 1 stops the copy operation of the MFP. That is, the document image generated by the reading unit 2 is not output.

The document image is not output in such a case (i.e., in the case in which the predetermined or larger number of pieces of the conditional copy permission information have been extracted), in order to inhibit the malicious user from making a copy of the document. Making an unauthorized copy by the malicious user may be the behavior as follows.

The behavior is such that a user puts a document, to which conditional copy permission information including a condition that the user knows is added, on a document plate simultaneously with a document, to which conditional copy permission information including a condition that the user does not know is added, so as to make a copy of the document to which the conditional copy permission information including the condition that the user does not know is added.

In this case (i.e., in the case in which the predetermined or larger number of pieces of the conditional copy permission information have been extracted), according to the first embodiment of the present invention, conditions associated with the conditional copy permission information which have been extracted by the predetermined or larger number of pieces are not extracted. That is, decoding is not performed for a low-density region of embedded information. Decoding is not performed because the execution speed of other jobs (for example, copying of another document, printing of another document image, transmission of another document image) may be delayed while the MFP extracts the conditions. If the execution speed of other jobs do not have to be considered, of course, the conditions associated with the conditional copy permission information which have been extracted by the predetermined or larger number of pieces can be acquired.

In contrast, if a smaller number than the predetermined number of pieces of the conditional copy permission information associated with different document IDs have been extracted, as long as all conditions for the smaller number of pieces of the information extracted are satisfied, copies of document images are made (S2311, S2312, S2313). Occasionally, the number of conditions for the smaller number of pieces of the information may be only one. In this case, satisfying only a single condition is satisfying all conditions for the smaller number of pieces of the information.

Now, it is assumed that a plurality of (for example, a predetermined number or larger number of) documents to which conditional copy permission information is added are put on the document plate. In such a situation, it is also assumed that different document IDs are added to the documents. Then, the number of the document IDs is a predetermined number or larger, and the pieces of the conditional copy permission information associated with the different document IDs are extracted. Hence, no document is copied. In contrast, it is assumed that the respective documents have the same document ID. Then, the number of pieces of the conditional copy permission information becomes one, and the number of the document IDs becomes smaller than the predetermined number. Hence, (if the condition is satisfied) the document images can be copied. The copies of the respective documents are made when the same document ID is added to the respective documents because the documents are created by a single copy operation and making copies of such documents is hardly unauthorized copying.

If the control unit 1 determines that the predetermined or larger number of pieces of the conditional copy permission information associated with the different document IDs have not been extracted (for example, if only a piece of the conditional copy permission information has been extracted) in S2310, the MFP acquires all conditions associated with the smaller number than the predetermined number of pieces of the conditional copy permission information (S2311). That is, the control unit 1 decodes the embedded information in the low-density region.

If the extracted condition includes a password, the control unit 1 causes the display unit 9 to display the screen to request the user to input information corresponding to the condition (i.e., password). In contrast, if the extracted condition does not include a password (for example, all conditions are user IDs), the display unit 9 does not have to display any particular screen. This is because the information corresponding to the condition (i.e., user ID) has been already input for user authentication.

Then, the control unit 1 determines whether the information input by the user satisfies all conditions extracted in S2311 (S2312).

If the control unit 1 determines that the input information satisfies all conditions in S2312, the MFP starts to output the document images (S2313). For example, when the user ID sent in S2301 matches with the solely extracted condition (in this case, the user ID in the extracted condition), the copy operation is started accordingly.

If the user has the other document to be scanned, the user removes the document from the document plate and puts the other document on the document plate. Then, when the user inputs a copy start instruction through the operation unit 5, the MFP executes the process from S2302.

In contrast, if the control unit 1 determines that the condition is not satisfied in S2312, the control unit 1 stops the copy operation of the MFP. That is, a copy of the document image generated by the reading unit 2 is not made.

The given description is for the control for copying executed by the MFP that has a function of inhibiting unauthorized copying.

Second Embodiment

In a second embodiment of the present invention, control for copying executed by a MFP different from the control according to the first embodiment of the present invention will be described. First, part that is different from the first embodiment of the present invention will be described.

Copy control information in the second embodiment of the present invention includes copy permission information in addition to conditional copy permission information and copy inhibition information. If the MFP reads a document to which the copy permission information is added, the MFP makes a copy of the document without requesting a user to input a condition, unlike the conditional copy permission information. That is, if a copy of the document, to which the copy permission information is added, is made, the user can make a copy of the document without condition.

Since the copy permission information is additionally included in the copy control information, the specific information includes two pieces of information of copy permission information and a document ID.

Next, an operation performed by a user and a process performed by the MFP in accordance with the operation by the user to add specific information will be described in detail with reference to FIG. 6(b). In the second embodiment of the present invention, an option to "permit copy" is added in a print security setting dialogue box 31. If the user selects this option, the copy permission information and the document ID are added as the specific information to a document to be printed. The behavior when that option is selected is similar to that in the first embodiment of the present invention.

Other part not described herein is similar to that in the first embodiment of the present invention. More specifically, the configuration of the MFP, the process of creating the document to which the specific information is added, and the process of extracting the specific information from a document to which the specific information is added in the form of bar codes, are similar to those in the first embodiment. That is, the MFP can extract the specific information.

Next, control for copying executed by the MFP that has a function of inhibiting unauthorized copying will be described in detail according to the second embodiment of the present invention. The control additionally includes a step (S2308.5) between S2308 and S2309 in the flowchart shown in FIG. 7. S2308.5 is a step of determining whether a predetermined or larger number of pieces of copy permission information associated with different document IDs have been extracted. Hereinafter, part that is changed because this step is added will be described.

If the control unit 1 determines that decoding of all embedded information has been completed in step S2308, the control unit 1 determines whether a predetermined or larger number of pieces of the copy permission information associated with the different document IDs have been extracted. The predetermined number is desirably larger than the aforementioned predetermined number. This is because the behavior of simultaneously making copies of documents to which copy permission information is added may have less intension of making unauthorized copies than the behavior of simultaneously making copies of documents to which conditional copy permission information is added.

If the control unit 1 determines that the predetermined or lager number of pieces of the copy permission information have been extracted, the control unit 1 stops the copy operation of the MFP. That is, the document image generated by the reading unit 2 is not output. Then, the control unit 1 progresses the process to the "end" of the flowchart in FIG. 7.

The document image is not output in such a case (i.e., in the case in which the predetermined or larger number of pieces of the copy permission information have been extracted), in order to inhibit the malicious user from making a copy of the document. Making an unauthorized copy by the malicious user may be such that a user puts a plurality of documents, to which copy permission information is added, on a document plate, and then the user puts a document, to which copy inhibition information is added, to make a copy of the document.

In this case, major part of a generated document image includes bar codes of copy permission information, and residual part includes copy inhibition information. Thus, the information acquisition unit 3 less likely finds a bar code including the copy inhibition information. Of course, the information acquisition unit 3 can theoretically find the bar code including the copy inhibition information. However, if the bar code is contaminated, such a bar code is less likely found. In light of this, the new step (S2308.5) is added to inhibit the malicious user from making an unauthorized copy.

The control for copying is described. If the control unit 1 determines that the predetermined (for example, five) or larger number of pieces of the copy permission information have not been extracted, the control unit 1 progresses the process to S2309, and determines whether the copy inhibition information has been extracted (S2309).

If the control unit 1 determines that the copy inhibition information has been extracted (if YES in S2309), the control unit 1 stops the copy operation of the MFP. That is, the document image generated by the reading unit 2 is not output.

If the MFP has extracted the copy inhibition information and the copy permission information in this process (that is, if the copy control information acquired in S2306 includes both), no document is copied. In other words, the document, to which the copy permission information is added and which should be copied, and the document, to which the copy inhibition information is added, are not copied. As a result, the behavior of the malicious user can be prevented from making an unauthorized copy of the document to which the copy inhibition information is added by using the document to which the copy permission information is added.

In contrast, if the control unit 1 determines that the copy inhibition information has not been extracted (if NO in S2309), the control unit 1 determines whether a predetermined (for example, two) or larger number of pieces of the conditional copy permission information associated with different document IDs have been extracted (S2310).

If the control unit 1 determines that the predetermined or larger number of the copy permission information associated with the different document IDs have been extracted (if YES in S2310), the control unit 1 stops the copy operation of the MFP. That is, the document image generated by the reading unit 2 is not copied.

In contrast, if the control unit 1 determines that the predetermined or larger number of pieces of the conditional copy permission information associated with the different document IDs have not been extracted (if NO in S2310), the control unit 1 determines whether the copy permission information and the conditional copy permission information have been extracted (S2310.3). This step (S2310.3) is also additionally included in the flowchart in FIG. 7.

If the control unit 1 determines that the copy permission information and the conditional copy permission information have been extracted (if YES in S2310.3), the control unit 1 stops the copy operation of the MFP. That is, the document image generated by the reading unit 2 is not output.

In contrast, if the control unit 1 determines that the copy permission information and the conditional copy permission information have not been extracted (if NO in S2310.3), the control unit 1 determines whether only the copy permission information has been extracted (S2310.6). That is, it is determined whether only the copy permission information has been extracted while the copy inhibition information or the conditional copy permission information is not extracted. If the control unit 1 determines that only the copy permission information has been extracted, the document image is output. In contrast, if the control unit 1 determines that the extracted information is not only the copy permission information, the process is executed from S2311 in the flowchart shown in FIG. 7. Other part not described herein is subjected to the operation control similar to that in the first embodiment of the present invention.

As it is found through the processes, the second embodiment of the present invention aims at such a user who uses a document, to which copy permission information is added, that is, which is copied without condition to make a copy of another document, to which conditional copy permission information including a condition that the user does not know is added. In particular, in this embodiment, the user is not only inhibited from making a copy of another document, but also from making a copy of the document (the document to which the copy permission information is added) as a penalty.

Other Embodiments

Described above is inhibition of making a copy of a document under various circumstances. However, a subject for inhibition is not limited to a copy operation. For example, outputting, for example, transmitting a document image to an external device may be inhibited. Regarding this, the copy inhibition information is called output inhibition information, the conditional copy permission information is called conditional output permission information, and the copy permission information is called output permission information.

In this specification, a bar code is an image that represents information in accordance with the thickness of a line and the position of a dot. The processes performed by the MFP have been described above on the basis of an exemplary form of a bar code. However, persons skilled in the art can replace the bar code in the above-described form with a bar code in a different form (for example, a two-dimensional bar code, such as a QR code or a griff code, or a bar code of a typically used type including a plurality of bars). Alternatively, the bar code in the above-described form may be replaced with a watermark or a mark. However, if a mark is used, different shapes of marks have to be defined for different pieces of information. Also, in this case, the MFP determines information indicated by a predetermined mark by using an existing pattern matching technique. The process of determining the information indicated by the predetermined mark by the pattern matching technique is also called extraction of information in this specification. Also, the watermark, the predetermined mark, and other bar codes in various forms are collectively called embedded images.

The determination has been made for the information indicated by the predetermined mark by using the pattern matching technique. Alternatively, the MFP does not have to determine the information indicated by the predetermined mark, and may control outputting (for example, copying) in accordance with the predetermined mark when the predetermined mark is found. For example, the MFP may inhibit a copy operation when the MFP detects a mark of "o (white circle)." Thus, when the MFP finds the "o," the copy operation is stopped in accordance with the mark of the "o." The same can be said to the conditional copy permission information. When the MFP finds a predetermined mark, the MFP controls outputting in accordance with the predetermined mark. In this case, a bar code or a watermark is not decoded. Outputting is controlled merely with reference to the shape of the image. In this specification, finding a predetermined mark is called "detection" of a predetermined mark.

In the above-described embodiments, the high-density region and the low-density region are provided, and important information is included in the high-density region. Accordingly, an effect can be obtained such that important information can be more likely extracted correctly from a document. However, persons skilled in the art may intentionally degrade the aforementioned effect. In this case, the densities in the regions do not have to be different from one another, and all regions in a bar code may have the same density.

In the above-described embodiments, as a method of associating two pieces of information (for example, conditional copy permission information and a document ID, or conditional copy permission information and a condition) with one another, the method of allowing the two pieces of information to be included in the same bar code has been disclosed. However, the method of associating the two pieces of information with one another may be another method. For example, predetermined information (for example, AAA) may be added to the start of the information, thereby associating the respective pieces of information with one another.

In the above-described embodiments, the number of document IDs is counted to identify the number of different bar codes. However, there is another identification method. For example, if information relating to a version of a bar code is added to a document, the MFP can identify the number of different bar codes with reference to a difference in versions of the bar codes. The information for identifying the difference in bar codes (for example, a document ID or version information of a bar code) is collectively called document identification information.

In the above description, a single document ID is added to only documents that are created by a single copy operation. However, a single document ID may be added to documents that are created by a single print operation (for example, a print operation performed in response to a print instruction from a personal computer).

In the above-described embodiments, a condition is expressed by a bit string and then is bar-coded. However, the condition does not have to be expressed in the direct form (in the form of a bit string directly corresponding to the condition). That is, the condition does not have to be bar-coded. Instead of the bar-coded condition, a hashed condition may be bar-coded. In this case, the MFP has to hold a hash function used for hashing the condition. In the embodiments of the present invention, the MFP that adds specific information is the same as the MFP that extracts the specific information. However, different MFPs may perform the respective processes. In this case, the MFP that adds a bar code and the MFP that extracts a bar code have to hold the same hash function. This is because, in a case in which the respective MFPs use different hash functions, even if a hashed condition is the same as a condition input by a user, the values of the two hashed conditions do not correspond to one another.

When the hashed condition is bar-coded, the steps in the flowcharts in FIGS. 2 and 7 are modified as follows. In the flowchart in FIG. 2, a step of hashing a condition by using a hash function (S103.5) is added between steps S103 and S104. In the process in step S103.5, the condition is hashed and then bar-coded.

Also, in the flowchart in FIG. 7, a process of hashing an input condition by using a hash function is added to step S2312. In step S2312, an extracted condition in a hashed state is compared with an input condition in a hashed state.

Also, the present invention may be implemented by executing the following processes. In particular, a software (program) that implements the function of any of the embodiments is supplied to a system or a device through a network or through any of various recording media, and a computer (or CPU, MPU, etc.) in the system or the device reads and executes the program.

REFERENCE SIGNS LIST

1 control unit
2 reading unit
3 information acquisition unit
5 operation unit
6 user authentication unit
7 memory
8 output unit
9 display unit
10 data base
11 encoding unit

The invention claimed is:

1. A device having a reading unit configured to read a document placed on a document plate for generating a document image in response to an instruction from a user to start a copy, and a detection unit configured to detect a bar code from the document image generated by the reading unit, the device comprising:

a determination unit configured to determine after the reading unit generates a document image corresponding to a plurality of sheets of a document in response to an instruction from a user to start a copy with the plurality of sheets of the document being placed on the document plate, whether or not the number of bar codes detected by the detection unit from the document image is equal to or more than a predetermined number; and a control unit configured to control not to print the generated document image corresponding to the plurality of sheets of the document in response to the determination that the number of bar codes detected by the detection unit is equal to or more than the predetermined number, and control to print the generated document image corresponding to the plurality of sheets of the document in response to the determination that the number of bar codes detected by the detection unit is less than the predetermined number, wherein the predetermined number is equal to or more than one.

2. The device according to claim 1, wherein the plurality of sheets of the document having a bar code printed is a copy-permitted document with copy permission information being added which is permitted to be copied without requesting a user to input condition information, and wherein the control unit controls not to print the generated document image corresponding to the plurality of sheets of the document in response to the determination that the number of detected bar codes corresponding to the copy permission information is equal to or more than the predetermined number, and controls to print the generated document image corresponding to the plurality of sheets of the document in response to the determination that the number of detected bar codes corresponding to the copy permission information is less than the predetermined number.

3. The device according to claim 1, wherein the plurality of sheets of the document having a bar code printed is a conditional-copy-permitted document with conditional copy permission information being added which is inhibited to be copied in a case where the conditional copy permission information added to the document does not match condition information input by a user and permitted to be copied in a case where the conditional copy permission information added to the document matches condition information input by a user, and wherein the control unit controls not to print the generated document image corresponding to the plurality of sheets of the document in response to the determination that the number of detected bar codes corresponding to the conditional copy permission information is equal to or more than the predetermined number, and controls to print the generated document image corresponding to the plurality of sheets of the document in response to the determination that the number of detected bar codes corresponding to the conditional copy permission information is less than the predetermined number.

4. A method of controlling a device, the device having a reading unit configured to read a document placed on a document plate for generating a document image in response to an instruction from a user to start a copy, and a detection unit configured to detect a bar code from the document image generated by the reading unit, the method comprising:

determining after the reading unit generates a document image corresponding to a plurality of sheets of a document in response to an instruction from a user to start a copy with the plurality of sheets of the document being placed on the document plate, whether or not the number of bar codes detected by the detection unit from the document image is equal to or more than a predetermined number; and controlling not to print the generated document image corresponding to the plurality of sheets of the document in response to determining that the number of bar codes detected by the detection unit is equal to or more than the predetermined number, and controlling to print the generated document image corresponding to the plurality of sheets of the document in response to determining that the number of bar codes detected by the detection unit is less than the predetermined number, wherein the predetermined number is equal to or more than one.

5. The method according to claim 4, wherein the plurality of sheets of the document having a bar code printed is a copy-permitted document with copy permission information being added which is permitted to be copied without requesting a user to input condition information, and wherein the controlling step further comprises controlling not to print the generated document image corresponding to the plurality of sheets of the document in response to determining that the number of detected bar codes corresponding to the copy permission information is equal to or more than the predetermined number, and controlling to print the generated document image corresponding to the plurality of sheets of the document in response to determining that the number of detected bar codes corresponding to the copy permission information is less than the predetermined number.

6. The method according to claim 4, wherein the plurality of sheets of the document having a bar code printed is a conditional-copy-permitted document with conditional copy permission information being added which is inhibited to be copied in a case where the conditional copy permission information added to the document does not match condition information input by a user and permitted to be copied in a case where the conditional copy permission information added to the document matches condition information input by a user, and wherein the controlling step further comprises controlling not to print the generated document image corresponding to the plurality of sheets of the document in response to determining that the number of detected bar codes corresponding to the conditional copy permission information is equal to or more than the predetermined number, and controlling to print the generated document image corresponding to the plurality of sheets of the document in response to determining that the number of detected bar codes corresponding to the conditional copy permission information is less than the predetermined number.

7. A non-transitory computer-readable medium having instructions recorded thereon, which, when executed by a computer, cause the computer to perform a method of controlling a device, the device having a reading unit configured to read a document placed on a document plate for generating a document image in response to an instruction from a user to start a copy, and a detection unit configured to detect a bar code from the document image generated by the reading unit, the method comprising:

determining after the reading unit generates a document image corresponding to a plurality of sheets of a document in response to an instruction from a user to start a copy with the plurality of sheets of the document being placed on the document plate, whether or not the number of bar codes detected by the detection unit from the document image is equal to or more than a predetermined number; and controlling not to print the generated document image corresponding to the plurality of sheets of the document in response to determining that the number of bar codes detected by the detection unit is equal to or more than the predetermined number, and controlling to print the generated document image corresponding to the plurality of sheets of the document in response to determining that the number of bar codes detected by the detection unit is less than the predetermined number, wherein the predetermined number is equal to or more than one.

8. The non-transitory computer-readable medium according to claim 7, wherein the plurality of sheets of the document having a bar code printed is a copy-permitted document with copy permission information being added which is permitted to be copied without requesting a user to input condition information, and wherein the controlling step further comprises controlling not to print the generated document image corresponding to the plurality of sheets of the document in response to determining that the number of detected bar codes corresponding to the copy permission information is equal to or more than the predetermined number, and controlling to print the generated document image corresponding to the plurality of sheets of the document in response to determining that the number of detected bar codes corresponding to the copy permission information is less than the predetermined number.

9. The non-transitory computer-readable medium according to claim 7, wherein the plurality of sheets of the document having a bar code printed is a conditional-copy-permitted document with conditional copy permission information being added which is inhibited to be copied in a case where the conditional copy permission information added to the document does not match condition information input by a user and permitted to be copied in a case where the conditional copy permission information added to the document matches condition information input by a user, and wherein the controlling step further comprises controlling not to print the generated document image corresponding to the plurality of sheets of the document in response to determining that the number of detected bar codes corresponding to the conditional copy permission information is equal to or more than the predetermined number, and controlling to print the generated document image corresponding to the plurality of sheets of the document in response to determining that the number of detected bar codes corresponding to the conditional copy permission information is less than the predetermined number.

* * * * *